United States Patent [19]

Keller et al.

[11] 4,209,458
[45] Jun. 24, 1980

[54] FLUORINATED PHTHALONITRILES

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 26,863

[22] Filed: Apr. 4, 1979

[51] Int. Cl.$^2$ .................... C07C 121/60; C07C 121/75
[52] U.S. Cl. ............................. 260/465 F; 260/465 G; 521/124; 528/9; 528/362
[58] Field of Search ........................ 260/465 F, 465 G

[56] References Cited

U.S. PATENT DOCUMENTS

| | | | |
|---|---|---|---|
| 3,787,475 | 1/1974 | Heath et al. | 260/465 F |
| 3,869,499 | 3/1975 | Heath et al. | 260/465 F |
| 3,957,863 | 5/1976 | Heath et al. | 260/520 E |
| 3,972,902 | 8/1976 | Heath et al. | 260/346.3 |
| 3,993,631 | 11/1976 | Griffith et al. | 260/78 TF |
| 4,056,560 | 11/1977 | Griffith et al. | 260/465 D |
| 4,057,569 | 11/1977 | Griffith et al. | 260/465 E |
| 4,080,319 | 3/1978 | Caporiccio et al. | 260/78 TF |

OTHER PUBLICATIONS

McLoughlin Tetrahedron Letters, No. 46, pp. 4761–4762, (1968).
Riley et al., Journal of Fluorine Chemistry, vol. 10, pp. 85–110, (1977).
Keller et al., Journal of Fluorine Chemistry, vol. 12, pp. 73–77, (1978).

*Primary Examiner*—Dolph H. Torrence
*Attorney, Agent, or Firm*—R. S. Sciascia; Philip Schneider; Thomas McDonnell

[57] ABSTRACT

A fluorinated phthalonitrile of the general formula:

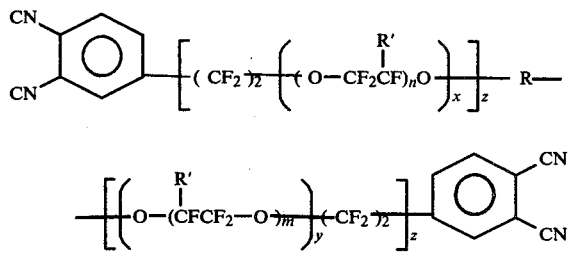

wherein R' is F or $CF_3$, R is $(CF_2)_p$, m is 1 or 2, n is 1 or 2, p is an integer from 3 to 30, x is 1, 2, or 3, y is 1, 2, or 3 and z is 0 or 1 is prepared by reacting 4-iodophthalonitrile with the appropriate diiodide in the presence of activated copper in a dipolar aprotic solvent. Heating this phthalonitrile to a temperature from about its melting point to about 285° C. produces a polyphthalocyanine resin. If a salt or metal is added prior to the heating, a metal or salt-coordinated polyphthalocyanine is produced. Polyphthalocyanines are useful in coatings, laminates, filament windings, castings, and structural composites.

8 Claims, No Drawings

FLUORINATED PHTHALONITRILES

BACKGROUND OF THE INVENTION

The present invention pertains generally to fluorinated tetranitriles and high-temperature resins prepared therefrom and in particular to perfluorinated phthalonitriles and polyphthalocyanine resins.

Polyphthalocyanine resins compare favorably with epoxies as structural materials with the added advantage of a higher thermal stability. These resins are stable to about 235° C. in an oxidizing atmosphere. One important property of resins which both epoxies and polyphthalocyanines are lacking to an objectionable degree for some applications is water repellency. Both resins absorb $H_2O$ in an amount from about five to ten percent of their weight in water.

Presently, a polyphthalocyanine is prepared from a phthalonitrile, which has two phenyl dinitrile groups separated by a bridging chain. The bridging chain of the phthalonitrile becomes the bridging chain between the phthalocyanine nuclei in the resin. The properties of a polyphthalocyanine resin arise from the nuclei which is the same for all polyphthalocyanines and from the bridging chains between the nuclei which are not the same. Research for new polyphthalocyanines entails synthesising phthalonitriles which have bridging chains with the desired properties and are capable of forming resins, and determining the reaction parameters of the resin synthesis. To date, the bridging chains have all been hydrocarbons, which have included aromatic, aliphatic, amide, saturated, and unsaturated hydrocarbons.

SUMMARY OF THE INVENTION

An object of this invention is to provide a polyphthalocyanine resin with improved water repellency.

Another object of this invention is to provide a polyphthalocyanine resin which is stable at a temperature above 235° C.

A further object of this invention is to provide a polyphthalocyanine which is more resistant to oxidative attacks.

These and other objects are achieved by synthesizing perfluorinated phthalonitriles and forming polyphthalocyanine resins therefrom, thereby obtaining a resin with highly water-repellent and oxidation-resistant fluorocarbon bridging chains.

DETAILED DESCRIPTION OF INVENTION

The phthalonitrile of the present invention is defined by the formula:

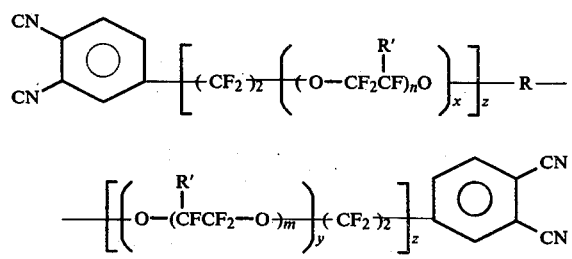

where R' is F or $CF_3$, R is $(CF_2)_p$, m is 1 or 2, n is 1 or 2, p is an integer from 3 to 30, x is 1, 2, or 3, y is 1, 2, or 3, and z is 0 or 1. If the bridging chain between the two phthalonitrile groups is represented by B, the formula can be written as

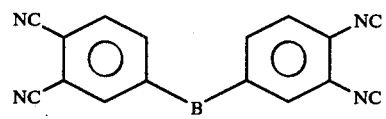

If z is zero, the phthalonitrile is defined by the formula:

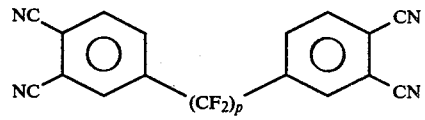

The length of the perfluorinated hydrocarbon bridging chain greatly affects the properties of the resulting PC resin because the phthalocyanine (PC) nucleus and the perfluorinated hydrocarbon impart different properties to the resin. The PC nucleus increases the rigidity, brittleness, hardness, and surface energy of the resin, whereas the perfluorinated hydrocarbon increases the softness, flexibility, and elasticity and decreases the surface energy.

The length of the bridging chain affects the reaction velocity of the PC-formation reaction on account of greater maneuverability of the reactive ends arising from an increase in the chain length. The increased maneuverability allows the reactive ends to more easily assume the geometric configuration necessary for the phthalocyanine formation. Since fluorocarbons are expensive, the cost of the resin is increased with a longer chain. From economic considerations only, the most preferred range for p is from 3 to 14 and the preferred range is from 3 to 20.

Since the phthalonitriles are prepared by a coupling reaction, it is possible for the bridging chain to have more than thirty repeating units. The disadvantages of those lengths would be an increased cost and a significant dilution of the contribution to the resin properties by the phthalocyanine nucleus. This phthalonitrile is prepared according to the schematic:

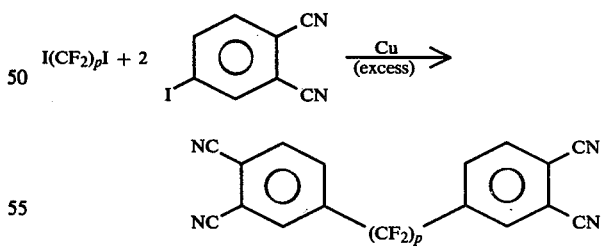

The mechanism of the reaction is similar to the direct preparation of many fluoroalkyl substituted aromatic compounds involving the reaction of fluoroalkanes and iodoaromatic compounds with a metallic coupling reagent in polar aprotic solvents. Substitution on the aromatic ring occurs exclusively at the iodine site even though the ring has additional substituent groups.

In practice, α, ω-perfluoroalkane and 4-iodophthalonitrile are mixed with a metallic coupling agent, such as activated copper or copper bronze, in a dry dipolar aprotic solvent. The mixture is heated to a temperature from about 115° to about 120° C. in a nonoxidizing atmosphere, e.g., argon, until the reaction is complete. Completion of the reaction is usually determined by monitoring one of the reactants, e.g., 4-iodophthalonitrile, by IR-analysis. Generally, the reaction time is from one to two hours. If the reaction is not terminated soon after completion, the phthalonitrile begins to form the phthalocyanine resin. Examples of the solvent are dimethyl formamide (DMF), dimethyl sulfoxide (DMSO), pyridine, hexamethylphosphoramide (HMPA), and dimethylacetamide (DMAC). The preferred solvent is dimethyl sulfoxide.

If z is 1, the phthalonitrile is represented by the general equation with the exception that z can not equal zero. The limitations on x and y also arise from the same practical considerations that dictate a limitation on "p", but cost is the most dominent consideration.

These phthalonitriles are prepared according to the schematic:

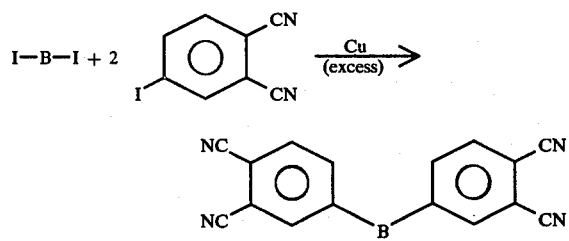

wherein B is defined as previously except z=1.

Information concerning the preparation of the starting materials may be found in the following references. The αω-diiodo-F-ether and -alkanes may be prepared by the method disclosed in Riley, et al. *The Synthesis of Fluoroether-Fluorosilicone Hybrid Polymers* In J. Fluorine Chem. 10: pp. 85–110, 1977 and McLaughlin, V. C. R. *Some Novel Perfluoroalkanedioic Acid Derivatives And α, ω-Di-Iodoperfluoroalkanes*. In Tetrahedron Letters, 46: p. 4761–62. 1968. The 4-iodophthalonitrile may be prepared by the method disclosed in Keller et al. *Synthesis of A Fluorinated Phthalocyanine*. In J. Fluorine Chem. 13: p. 73, January, 1979.

Examples of the preparation of the starting materials and phthalonitriles of the present invention are herein given. It is understood that the examples are given by way of explanation and are not meant to limit this disclosure or the claims to follow in any manner.

EXAMPLE I

Synthesis of 4-Iodophthalonitrile.

4-Aminophthalonitrile (40 g, 0.28 mol) was slowly added to 80 ml of concentrated sulfuric acid and the mixture was stirred with cooling (below 25° C.) until dissolution was complete. After cooling below 15° C., ice water (175 ml) was slowly added to precipitate the amine bisulfate. A solution of sodium nitrite (20 g, 0.29 mol) in 40 ml of water was then added at such a rate as to maintain the temperature at 0°–10° C. After stirring the solution for an additional 15 minutes, a few crystals of urea were added to decompose any excess sodium nitrite. The homogeneous solution was then poured into a breaker containing potassium iodide (75 g, 0.45 mol) dissolved in 150 ml of water. After the evolution of nitrogen had ceased and a negative test with alkaline p-methoxyphenol indicated that the reaction was complete, the brown precipitate was collected by suction filtration and washed with 10% sodium bisulfite, with saturated sodium bicarbonate and finally with water. Recrystallization from ethanol-water afforded 51 g (72%) of the desired product, m.p. 141°–142° C.

EXAMPLE II

Preparation of 1.5-Bis(2-Iodotetrafluorethoxy)Perfluoropentane.

To a 500 ml Fischer Porter tube was added 25.2 g (0.43 mol) of dry KF, 150 ml of dry diglyme and 37.4 g (0.15 mol) of perfluoroglutaryl fluoride. The content was stirred for 4 hours or until the medium had cooled. At this time, 112 g (0.44 mol) of iodine was added with stirring until dissolution was complete. After cooling to $-120°$ C. in an ethanol bath, 40 g (0.40 mol) of tetrafluoroethylene was condensed into the bottle and the vessel was shaken at room temperature for 65 hours. The vessel was vented and the product mixture was poured into water. The organic layer (bottom) was collected and washed with saturated sodium bisulfite and then with water and dried over anhydrous sodium sulfate. Distillation at reduced pressure yielded 39 g (35%) of the desired product, b.p. 61°–65° C. (1.2 mm).

EXAMPLE III

Synthesis of 1,3-Bis(3,4-Dicyanophenyl)Perfluoropropane.

1,3-Diiodoperfluoropropane (2.0 g, 5 mmol), 1.8 g (30 meq) of activated copper, 2.5 g (10 mmol) of 4-iodophthalonitrile and 6 ml of dry dimethyl sulfoxide were purged for 15 minutes with argon and the mixture was then heated at 115°–120° C. for 4 hours. After cooling, the content was poured into 100 ml of water and extracted with four 50 ml portions of ether. The combined ethereal extract was washed with water, charcoaled, dried over anhydrous sodium sulfate and concentrated at reduced pressure to afford 1.1 g (52%) of product, m.p 133°–135° C.

EXAMPLE IV

Preparation of Bis(3,4-dicyanophenyl-2-tetrafluoroethoxy)-1,5-perfluoropentane

A three-necked flask was charged with 7.0 g (9.5 mmol) of 1,5-bis(2-iodotetrafluoroethoxy)perfluoropentane, (5.1 g, 20 mmol) of 4-iodophthalonitrile, 4.0 g (63 meq) of freshly prepared activated copper bronze and 25 ml of DMSO. The resulting heterogeneous mixture was flushed for 15 minutes with argon and heated under an argon atmosphere at 115°–120° C. for 3 hours. At the end of this time, the reaction mixture had taken on a green color. After cooling, the contents were poured into 150 ml of ice water. The crude solid (6.1 g) was collected by suction filtration. Purification was achieved by washing the crude solid material with 75 ml of hot methanol and concentrating to approximately 25 ml. While still hot, 10 ml of hot water was added. Upon cooling 3.6 g (51%) of bis(3,4-dicyanophenyl-2-tetrafluoroethoxy)-1,5-perfluoropentane was isolated, m.p. 193°–196° C.

The structure formula of polyphthalocyanine resins encompassed by the present invention is:

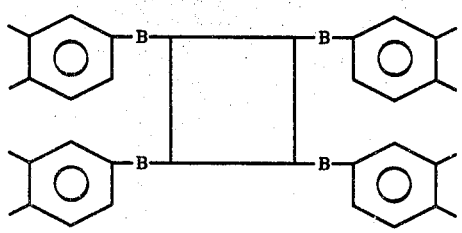

wherein B is defined

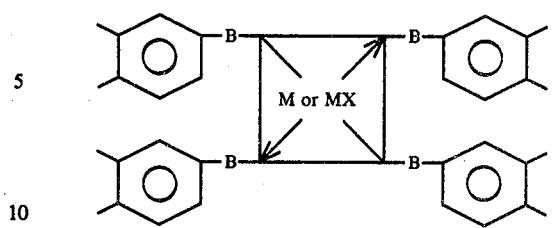

wherein B is defined as before and ⊠ is defined as

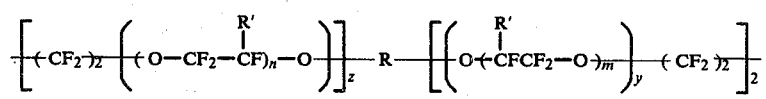

and □ is phthalocyanine nucleus, which has the formula:

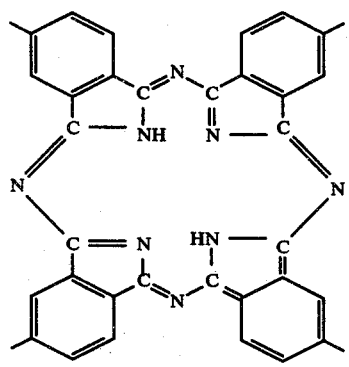

A polyphthalocyanine resin is prepared from a phthalonitrile of this invention by heating the phthalonitrile at a temperature from about the melting point of the phthalonitrile to about 285° C. in air or an inert atmosphere or an evacuated system at 1 to 10 mm Hg. At temperatures lower than 200° C., this reaction is extremely slow. The preferred method of preparation comprises heating a phthalonitrile to its melting point and then slowly raising the temperature to about 220° to about 250° C. After the melt, the viscosity starts to increase due to the onset of phthalocyanine formation which is called the B-stage. At the B-stage, the material can be cooled to a frangible solid and can be stored indefinitely without further reaction. The C-stage is obtained from the B-stage resin by breaking up the B-stage resin and heating the resin at the above temperatures. The preferred temperature for reacting the resin to the C-stage is from 200° C. to 250° C. and the most preferred is from 200° C. to 220° C. The optimum cure for any particular resin at a particular temperature is determined empirically by testing the structural strength of samples over a range of cure times.

If the phthalonitrile is mixed with a salt or metal, a salt- or metal-coordinated polyphthalocyanine resin is obtained which is represented by the formula:

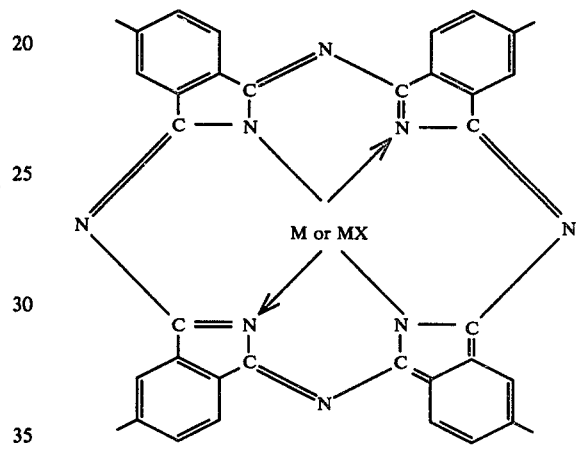

wherein M is a metal and MX is a salt. The reaction proceeds as previously but more quickly (about 10 to 25 percent quicker).

Generally, the preferred amount of metal or metal salt is the stoichiometric amount i.e., one equivalent of metal or salt for each two equivalents of bisorthodinitrile. If an excess of a metal or a salt, especially a salt, is used, is used, foaming results. Even with a stoichiometric amount, foaming may result or the reaction may proceed too quickly. In that case, an amount less than the stoichiometric amount should be used. Examples of metals which may be used are chromium, molybdenum, vanadium, beryllium, silver, mercury, aluminum, tin, lead, antimony, calcium, barium, manganese, magnesium, zinc, copper, iron, cobalt, nickel, palladium, and platinum. Mixtures of these metals may also be used. The preferred metals are copper, silver, and iron.

Suitable metal salts include cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride and mixtures thereof. The preferred salts are cuprous chloride, stannic chloride, stannous chloride hydrate, and ferrous fluoride. The cyano-condensation resins forms with metal salts have the disadvantage of air spaces in the resin caused by foaming during the preparation. As a consequence resins with metal salts are not as important as the plain resins or the resins with a metal. One exception to the poorer quality of salt-coordinated resin is stannous chloride. Although foaming is a problem, it can be controlled enough so that the resin is comparable to non-salt polyphthalocyanine resins. Due to dispersability problems, the stannous chloride must be added in the form of stannous chloride dihydrate. In fact the SnCl$_2$-coordinated polyphthalocyanine resin is preferred on account of the improved reaction times. The reaction time is 20 to 25 percent faster.

A cured resin is a three-dimensional network polymer shown by the following formula:

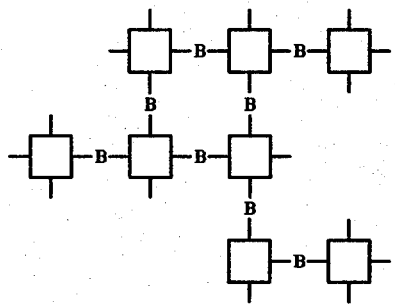

wherein ⟨⟩ and B are defined as before. The polyphthalocyanine resin may be represented by the formula: (B$_2$PC)$_n$ or (B$_2$M.PC)$_n$ or (B$_2$MX.PC)$_n$ wherein B is the bridging chain, PC is the phthalocyanine nucleus, M is a metal, MX is a salt, the "." denotes a salt- or metal-coordinated PC, and n is any number since the polymer is of the infinite type.

In summary the preparation of cyano-condensation resins with a metal or a salt comprises mixing a bisorthodinitrile with a salt or metal, outgassing the mixture as previously described, and heating the mixture to a temperature above the melting point of the bisorthodinitrile. The preferred and most preferred temperatures are the same as those for the syntheses without a metal or salt. Since the salt or metal becomes part of the cyano-condensation resin, decreasing the particle size provides a more efficient utilization of the salt or metal. Thus particle sizes up to 2000 μm are preferred. The preferred amount of the salt or metal is the stoichiometric amount.

Examples of the preparation of polyphthalocyanines are herein given. These examples are also given by way of explanation and are not meant to limit the disclosure or the claims to follow in any manner.

EXAMPLE V

Polyphthalocyanine formation from 1,3-Bis(3,4-dichyanophenyl)-perfluoropropane.

1,3-Bis(3,4-dicyanophenyl)-perfluoropropane (0.25 g, 0.6 mmol) and stannous chloride dihydrate (0.07 g, 0.3 mmol) were placed in a test tube and slowly heated to 130° C. where the monomer melted. At 140° C., homogeneity occurred and the sample started to darken almost immediately. The sample was heated at 200° C. for 10 hours and postcured at 220° for 24 hours.

EXAMPLE VI

Phthlocyanine formation from Bis(3,4-dicyanophenyl-2-tetrafluoroethoxy-1,5-perfluoropentane A quantity (0.3 g) of the phthalonitrile was melted and heated 220° C. for 3 days (weekend). The sample had solidified. The dark color (green) and the absence of any cyano absorption (2240 cm$^{-1}$) was taken as evidence that phthalocyanine formation had occured.

Samples of polyphthalocyanine resins prepared in Examples 5 and 6 were prepared as previously. A one-gram sample of each resin was allowed to soak in water for twenty-four hours. All three samples had less than one-percent increase in weight due to water absorption. This amount represents a significant improvement over previous polyphthalocyanine resins which had water gains from about 5 to 10 weight percent.

Other samples of the above polyphthalocyanine resins were heated in air. No loss of weight was detected at temperatures below 285° C. For temperatures from 285° to 300° C., the weight loss was about one percent per 24 hours. In contrast, previous polyphthalocyanine resins started decomposing at 235° C.

These test results demonstrate that a fluorocarbon bond in the bridging chain greatly enhances the water resistance of the resin and is considerably more oxidation resistant than a hydrocarbon bond in the bridging chain. These improvements should further increase the use of polyphthalocyanine resins as structural composites for aircraft and missiles. Further, since these resins are more resistant to oxidation, the resins are more resistant to corrosive attacks by oxidizing agents such as a sulfuric acid, nitric acid, and other sulfur, oxygen, nitrogen, halogen oxidizing compounds.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A fluorinated phthalonitrile of the general formula:

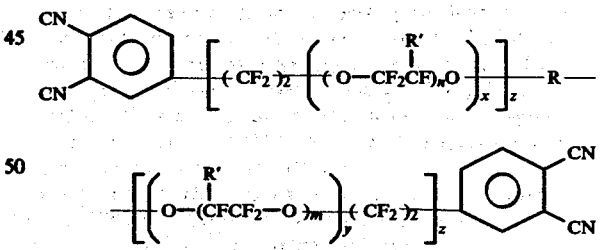

wherein R' is F or CF$_3$, R is (CF$_2$)$_p$, m is 1 or 2, n is 1 or 2, p is an integer from 3 to 30, x is 1, 2, or 3, y is 1, 2, or 3 and z is 0 or 1.

2. The phthalonitrile of claim 1 wherein p is from 3 to 14.

3. The phthalonitrile of claim 1 wherein z is zero.

4. The phthalonitrile of claim 1 wherein R' is F.

5. The phthalonitrile of claim 4 wherein m and n are 2.

6. The phthalonitrile of claim 5 wherein p is from 3 to 14.

7. The phthalonitrile of claim 5 wherein p is 5.

8. The phthalonitrile of claim 3 wherein p is from 3 to 14.

* * * * *